C. FALB.
STRENGTHENER FOR EYEGLASS CASES.
APPLICATION FILED FEB. 14, 1919.
1,302,341.
Patented Apr. 29, 1919.
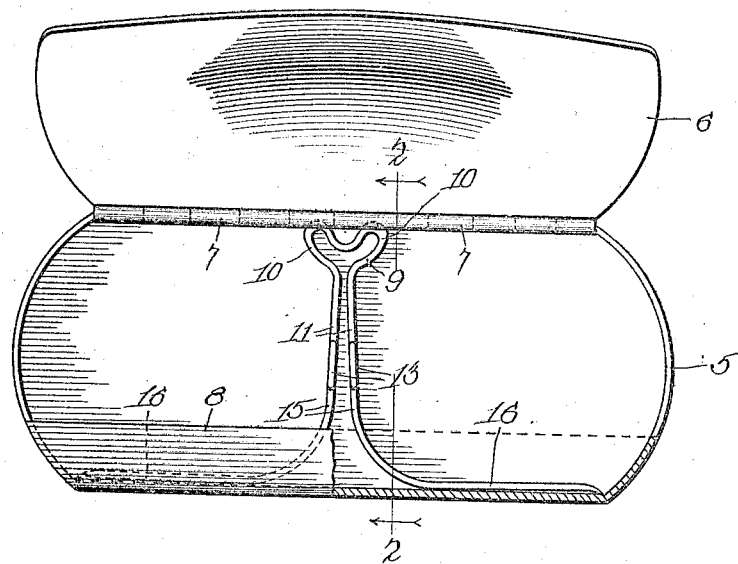
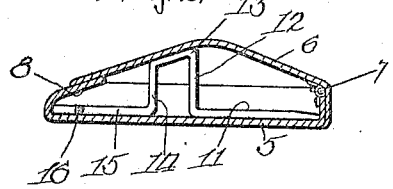
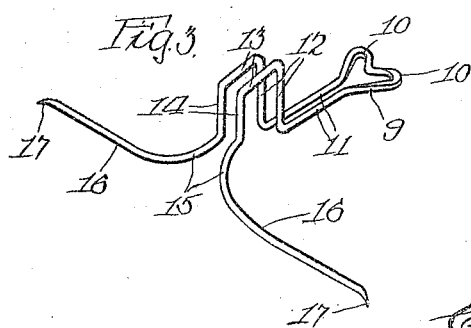
Inventor:
Charles Falb.
By Chas. C. Tillman
Atty.
Witness:
Leo J. Dubois.

UNITED STATES PATENT OFFICE.

CHARLES FALB, OF ESTHERVILLE, IOWA.

STRENGTHENER FOR EYEGLASS-CASES.

1,302,341. Specification of Letters Patent. Patented Apr. 29, 1919.

Application filed February 14, 1919. Serial No. 276,912.

*To all whom it may concern:*

Be it known that I, CHARLES FALB, a citizen of the United States, residing at Estherville, in the county of Emmet and State of Iowa, have invented certain new and useful Improvements in Strengtheners for Eyeglass-Cases, of which the following is a specification.

This invention relates to a new and useful attachment to or appliance for use in connection with eye glass cases of the type in which a hollow body for the reception and retention of the glasses has a lid or cover hinged to one of its side edges, and it consists in certain peculiarities of the construction, novel arrangement and operation of its parts, as will be hereinafter more fully set forth and specifically claimed.

The principal object of the invention is to furnish a strengthener or stiffener for eye glass cases, which shall be extremely simple and inexpensive in construction, strong, durable and efficient in operation, and so made that it can be readily applied to or removed from the case by an unskilled person.

A further object of the invention is to provide a device of the above mentioned general character, which, when in position in the case, will strengthen the latter to such an extent as to render it practically, if not absolutely, non-crushable when closed, and subjected to strains, pressure, or blows, thus protecting the glasses contained by the case from breakage or damage to the bridge or metal parts thereof.

A further object is to provide a strengthener or stiffener for eye glass cases, which shall be of such construction and characteristics that it will adapt itself to cases of slightly different widths without any alteration in its size, and will not interfere with the removal or replacing of the glasses within the casing, and besides will limit the longitudinal movement of the glasses, thereby preventing injury to the lenses of rimless glasses incident to them striking the ends of the case. Further objects and advantages of the invention will be disclosed in the subjoined description and explanation.

In the accompanying drawing, which serves to illustrate an embodiment of the invention—

Figure 1 is a plan view of an eye glass case, showing its lid raised or in open position, and illustrating the strengthener in the position it will occupy when in use;

Fig. 2 is a cross sectional view taken on line 2—2 of Fig. 1, looking in the direction indicated by the arrows; and Fig. 3 is a detached perspective view of the stiffener.

Like numerals of reference refer to corresponding parts throughout the different views of the drawing:

The numeral 5 designates the body of the case, which may be made of any suitable size, form and material, but by preference of an elongated shape with transversely rounded end portions, and with a flat bottom, as is clearly shown in Fig. 2 of the drawing.

As shown in Figs. 1 and 2 of the drawing, the body 5 of the case has secured to one of its side edges a lid or cover 6, which is transversely, as well as longitudinally arched in the well-known way employed in eye glass cases of the standard type. The lid 6 is attached to the rear side edge of the body 5 by means of hinges 7 of the well-known or ordinary construction, fashioned to hold the lid in closed position, as shown in Fig. 2 of the drawing. The opposite or front edge of the body 5 is provided with an inturned flange or ledge 8, which extends the entire length of the body at said edge, and is for the purpose of holding portions of the lenses between said ledge and the bottom of the casing.

As is clearly shown in Fig. 3 of the drawing, the strengthener or stiffening device consists of a single piece of wire of any suitable size and material, but by preference of brass and of 16-gage. The wire is bent at about its middle to form a bifurcated portion 9, which is substantially heart-shaped as shown and may have its prongs 10 flattened so as to enable the said prongs to lie under the hinges of the case without interference therewith. The strands of the wire are extended from the bifurcated portion or head 9 in substantial parallelism with one another and in the same plane with the head 9, thus forming a part of the base portion 11 of the strengthener. At the inner ends of the strands forming the part 11, which strands are of a length to extend to about the transverse middle of the case, said strands are bent upwardly in parallelism with each other as at 12 and are then bent so as to lie transversely with respect to the case as at 13 for a short distance, and then downwardly as at 14 to a point in the same plane with the base portion 11, thus providing another base portion 15 to rest on the inner surface of the front portion of the case. The strands forming the parts 12, 13 and 14 are located substantially in a parallel plane with each other, but at the base portion said strands diverge or are extended in opposite directions in substantially the same plane with the base portions 11 and 15, thereby providing spring members 16, each of which by preference has its free end slightly deflected and pointed as at 17 to engage the inner surface of the side wall of the case between the bottom 5 and ledge 8 thereof. By this construction it is evident that the support of the strengthener, consisting of the portions 12, 13 and 14, will project a sufficient distance from the bottom of the case to allow the part 13 to rest under and support the lid or cover 6, when the same is in its closed position, as shown in Fig. 2 of the drawing, and that by reason of this central support or post the lid and bottom of the case will be prevented flattening out or being crushed by pressure, strains, or blows, and that consequently the glasses which are located in the case, with the bridge astride the support or center post, will be absolutely protected against breakage or damage to the metal parts thereof. It is further obvious that as the bridge of the glasses stride the post or support, the glasses will be prevented shifting to either end of the case, thus protecting the lenses of rimless glasses from injury incident to contact with said ends.

In order to apply the device to the case, the members 16 may be placed between the ledge 8 and the bottom 5 of the case so as to rest in about the position shown in Fig. 1 of the drawing, when, by pressing on the center post or support in the direction of said members, the prongs 10 of the head 9 may be inserted under the hinges 7 of the lid or cover so as to rest flatly on the inner surface of the bottom of the case, in which position the resiliency of the members 16 will securely hold the strengthener in position. As the members 16, as well as the entire strands of the wire out of which the strengthener is made, possess considerable resiliency in a lateral direction, it is manifest that the device will adapt itself to cases of slightly varying widths, thus requiring no change or alteration in the sizes of the device. However, if cases of considerable difference in sizes, especially widths, are to be equipped with the strengthener, it is apparent that they can be made of sufficient sizes to fit said cases.

Having thus fully described my invention, what I claim as new and desire to secure by Letters Patent is:—

1. A strengthener for eye-glass cases, consisting of an elongated body having portions thereof in the same plane and provided at one of its ends with diverging resilient members and between its ends with a support extended from said plane.

2. A strengthener for eye-glass cases consisting of a wire formed into two strands having portions thereof in substantial parallelism with one another in substantially the same plane and provided in said plane at their juncture with a loop, said strands having portions extended in substantial parallelism with each other from said plane and provided with laterally and oppositely extended portions opposite said loop.

3. A strengthener for eye-glass cases consisting of a wire bent at about its middle into the form of a bifurcated loop or head and into two strands leading from said head, said strands having portions thereof in substantial parallelism with one another in substantially the same plane and between the ends of said parallel portions with portions extended in substantial parallelism with each other from said plane, said strands having laterally and oppositely extended portions opposite said loop or head.

CHARLES FALB.